United States Patent Office 3,147,122
Patented Sept. 1, 1964

3,147,122
PROCESS FOR IMPROVING THE TEXTURE OF MEAT BY AQUEOUS INJECTION CONTAINING CELLULOSE GUM
Beverly E. Williams, La Grange Park, Ill., assignor, by mesne assignments, to Chas. Pfizer & Co., Inc., New York, N.Y., a corporation of Delaware
No Drawing. Filed Sept. 28, 1961, Ser. No. 141,317
1 Claim. (Cl. 99—107)

This invention relates to improving the texture of meat and especially enzyme tenderized meat by post-mortem injection of an aqueous solution containing cellulose gum while the meat is still warm and flaccid and before completion of rigor mortis.

I have heretofore proposed and disclosed various processes for tenderizing and improving the flavor of meat by post-mortem stitch pumping of the carcass while still warm and flaccid and before rigor mortis is completed utilizing an aqueous solution at pressures in the range of from 40 to 100 pounds. Preferably this aqueous solution is at least at animal body temperature and up to approximately 100° F. When tenderizing only is desired, plain water can be used and if improvement in flavor and additional tenderness are also desired various of the proteolytic enzymes may be added to the aqueous solution.

The aqueous solution is usually stitch pumped into the carcass in amounts approximating 1 to 3% by weight of the carcass weight. The additives to the aqueous solution are used within the ranges which I have previously disclosed. When stitch pumping of the carcass is unskillfully performed and especially for certain types of meat it is possible to obtain watery meat with the described amounts of water. It is possible to add gelatin to the aqueous solution to hold this moisture in the carcass to help prevent watery meat. However, gelatin often leaves an undesirable cooking residue. Also, if an enzyme is to be employed in the aqueous solution, gelatin cannot be used because of the greater affinity of the enzyme for the gelatin protein than for the meat.

This difficulty is not encountered when the enzyme is injected ante-mortem into the jugular vein and the carcass stitch pumped post-mortem with water and gelatin. In this procedure when the enzyme reaches the capillary ends it is dispersed and distributed by the injected water containing gelatin but such is not the case when the enzyme and gelatin are injected simultaneously post-mortem. However, it is most advantageous to inject or stitch pump the enzyme and other additive to the aqueous solution to hold the water in the meat at the same time to simplify procedures and to interfere as little as possible with the killing floor techniques.

Most unexpectedly, I have found that edible cellulose gums, which are an accepted and approved food product, act, when added to the aqueous solution stitch pumped into the carcass post-mortem, to absorb, hold and distribute the added or loose, free moisture, thereby improving the texture of the meat and preventing watery meat. Further, such edible cellulose gums are not affected by the enzyme and the enzymes have no affinity for such gums.

One such edible cellulose gum is sodium carboxymethylcellulose which is also known as cellulose glycolate. This gum is readily soluble in either hot or cold water; is unaffected by freezing; is a hydrophilic colloid; and thickens, suspends and stabilizes the aqueous solution. Other food grade, edible colloids, gums, gels, algae and starches may be used.

One such food grade cellulose product is level-off D.P., described in U.S. Patent No. 2,978,446.

Cellulose gums, food grade, are water-soluble cellulose derivatives in which the cellulose molecule is attached by ether oxygen atoms to lower alkylene radicals. Exemplary of such cellulose ethers are alkyl cellulose ethers such as methyl cellulose ether, and substituted alkylene cellulose ethers such as hydroxyethyl cellulose and sodium salts of carboxymethyl cellulose ethers. I have found that the objects of this invention can be obtained particularly effectively when the cellulose ether used is an alkali metal salt of a carboxyalkyl cellulose ether. Illustrative of such cellulose ethers are, for example, the sodium salt of carboxymethyl cellulose ether, the potassium salt of carboxymethyl cellulose ether, the lithium salt of carboxymethyl cellulose ether, the sodium salt of carboxyethyl cellulose ether, the sodium salt of carboxypropyl cellulose, and so forth. A particularly preferred ether of this type for the present purposes is cellulose glycolate, which is the sodium salt of a carboxymethyl ether of cellulose.

Cellulose is a natural polymer comprising a chain of anhydroglucose ($C_6H_{10}O_5$) units. There are three reactive hydroxyl groups on each anhydroglucose unit. To prepare cellulose glycolate, as is well known in the art, cellulose is treated with alkali to convert at least some of the stated hydroxyl groups to the sodium salts thereof; and the resulting alkali cellulose is then reacted with sodium monochloracetate to produce substitution of carboxymethyl groups on the cellulose molecule, as illustrated by the following equation:

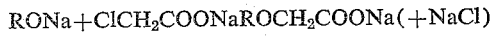

$$RONa + ClCH_2COONaROCH_2COONa(+NaCl)$$

where "R" represents the cellulose structure. The product is the cellulose derivative referred to herein as cellulose glycolate.

Usually less than the total number of hydroxyl groups in the cellulose molecule are converted by the stated reaction to the glycolate salt. There is a correlation between the degree of substitution and the water solubility of the product, and this factor may be varied to produce different grades of the cellulose glycolate. In general, for the present purposes, useful grades include a grade in which the degree of substitution is from about 1 to about 1.5 and more specifically, in the range of from about 1.20 to about 1.40—that is, approximately 1.20–1.40 out of each 3 hydroxyl groups per anhydroglucose unit in the cellulose chain have been converted to the glycolate salt—and also a grade with a degree of substitution in the range of from about 0.50 to about 1.00, and more specifically, from about 0.65 to about 0.85 or 0.95.

Variation in degree of polymerization of the cellulose chain also has an important influence on properties of the cellulose glycolate, specifically, on the viscosity of its solutions. The presently useful types of cellulose glycolate include products of widely varying viscosity, ranging, for example, from a product having a viscosity of 200–800 centipoises at 25° C. at a 2% concentration to one having a viscosity of 1300–2200 centipoises at 25° C. at a 1% concentration (in water). Since the present invention relates to preparation of a food product, the type of cellulose glycolate employed will be that sold for use in foods, drugs and cosmetics, of a degree of purity which is safe for oral ingestion.

In accordance with the present concept, an approximate 300 pound side of beef while still warm and flaccid and before completion of rigor mortis was stitch pumped with 6 pints of an aqueous solution containing one ounce of cellulose glycolate and 8 ounces of monosodium glutamate. These 6 pints of water approximated 2% by weight of the side of beef. The cellulose glycolate thickened the solution requiring somewhat higher pressures to be used with the solution than with plain water because of the pressure drop at the needles. Pressures of approximately 100 pounds per square inch were supplied to the solution which resulted in the solution being distributed in the carcass at pressures approximating 60 pounds per square inch. Pressures of from 40 to 100 pounds per square inch are required at the needles to get proper distribution of the solutions containing edible cellulose gums.

The side of beef so treated and the control mate side were then hung in the conventional cooler for 7 days. Thereafter the sides were divided into conventional cuts and were checked for color of meat, condition, water pockets and the like. An improvement in the texture of the meat was surprisingly found and there was no physical evidence of added moisture, wateriness or pockets of moisture. The cellulose gum successfully collected, distributed and held the surplus fluids combining the natural fluids and juices of the meat with the injected fluid. The hydroscopic gum picked up and retained any surplus moisture in the beef. The ribbed-down beef and all the freshly opened and exposed red meat surfaces had a smooth, velvety texture to the touch and feel. Organileptic tests of the cooked treated meat showed the meat to be uniformly more tender and of better flavor. The latter improvement was attributed to the added monosodium glutamate, a known meat flavor enhancer.

An appropriate amount of enzyme as described in my previous disclosures can be used in the injection solution because of the lack of affinity between the enzyme and the cellulose gum. The enzyme will, of course, increase the tenderness of the meat but enzymes also tend to increase the wateriness of meat by breaking down the solid protein and rendering it soft and watery to the touch and taste. The monosodium glutamate, used in the aqueous solution discussed above, improved the flavor of the meat. However, neither monosodium glutamate nor an enzyme is necessary to the process of the present concept, but the present concept is most helpful to the tenderizing of meat with added proteolytic enzymes. However, the injection solution may contain only water and the cellulose gum to improve the physical texture of the lean of beef, for example, and to prevent watery meat.

In another test, an approximate 300 lb. side of beef was injected, before the completion of rigor with water and cellulose gum, only. The amount of water was 3% of the weight of the side of beef, or approximately 9 pints, plus 1 oz. of food grade cellulose gum. The test side of the mate control side were chilled together and kept together in the same cooler for 7 days, then cut into primal and later, retail cuts, compared and subsequently cooked and eaten. The physical comparison in the cooler revealed an improved texture, a velvety-smooth, absence of coarseness feel and no evidence of added moisture from the cuts of the test side compared with the mate cuts of the control side. Cooking and eating tests indicated a preference, both in texture and tenderness, for the treated steaks and roasts.

It should now be apparent that the present invention provides an entirely novel and unexpected result in prevention of watery meat.

What is claimed is:

In a method for improving the texture of meat, the step of distributing a solution of water and the sodium salt of carboxymethylcellulose in the muscle portion of the meat by multiple entry injection, the water of the solution being 1–3% by weight of the meat and the solution containing approximately 1 ounce of the sodium salt of carboxymethylcellulose for each 300 pounds of meat, the solution being injected under pressures of from 40 to 100 pounds per square inch directly into the muscle of freshly slaughtered animals whereby the muscle bundle fibers are uniformly penetrated, separated and saturated by the solution.

References Cited in the file of this patent

UNITED STATES PATENTS

| | | |
|---|---|---|
| 2,721,142 | Shinn et al. | Oct. 18, 1955 |
| 2,805,163 | Williams et al. | Sept. 3, 1957 |
| 2,811,454 | Pressman | Oct. 29, 1957 |
| 2,876,115 | Epstein | Mar. 3, 1959 |
| 2,992,925 | Green et al. | July 18, 1961 |

FOREIGN PATENTS

| | | |
|---|---|---|
| 681,052 | Great Britain | Oct. 15, 1952 |